United States Patent [19]

McDonald

[11] Patent Number: 5,066,108
[45] Date of Patent: Nov. 19, 1991

[54] HIGH THROUGHPUT CONTRAST ENHANCEMENT FOR POLARIZED DISPLAYS

[75] Inventor: Mark E. McDonald, Plays del Rey, Calif.

[73] Assignee: Hughes Aircraft Company, Los Angeles, Calif.

[21] Appl. No.: 455,115

[22] Filed: Dec. 22, 1989

[51] Int. Cl.$^5$ .............................. G02F 1/13
[52] U.S. Cl. ............................ 359/65; 359/73; 359/93; 359/497
[58] Field of Search ......... 350/337, 338, 345, 347 E, 350/347 R, 384, 388, 403, 407, 352; 353/20, 122

[56] References Cited

U.S. PATENT DOCUMENTS

| | | | |
|---|---|---|---|
| 3,503,667 | 3/1970 | Tiedeman | 350/388 |
| 4,088,400 | 5/1978 | Assonline et al. | 350/347 R |
| 4,093,356 | 6/1978 | Bigelow | 350/338 |
| 4,398,805 | 8/1983 | Cole | 350/345 |
| 4,726,663 | 2/1988 | Bouzak | 350/347 E |
| 4,772,104 | 9/1988 | Buhrer | 350/403 |
| 4,884,876 | 12/1989 | Lipton et al. | 350/347 E |

FOREIGN PATENT DOCUMENTS

| | | | |
|---|---|---|---|
| 0110422 | 5/1988 | Japan | 350/345 |
| 0302619 | 2/1989 | Japan | 350/337 |
| 0173012 | 7/1989 | Japan | 350/337 |
| 0179019 | 7/1989 | Japan | 350/337 |

*Primary Examiner*—Rolf Hille
*Assistant Examiner*—Tan Ho
*Attorney, Agent, or Firm*—Leonard A. Alkov; Wanda K. Denson-Low

[57] ABSTRACT

A display having a linearly polarized image source, a quarter-wave retarder for transforming the linearly polarized illumination to circularly polarized illumination, imaging elements responsive to the circularly polarized illumination for producing viewable circularly polarized imaging illumination, and a circular imaging illumination to viewable linearly polarized imaging illumination. The circular polarizer includes a quarter-wave retarder for transforming the circular light to linearly polarized light, and a linear polarizer configured to transmit the linearly polarized imaging illumination. Contrast enhancement is achieved by the circular polarizer which functions to block ambient light reflected from the front element of the imaging elements as a result of transmission through the circular polarizer.

2 Claims, 2 Drawing Sheets

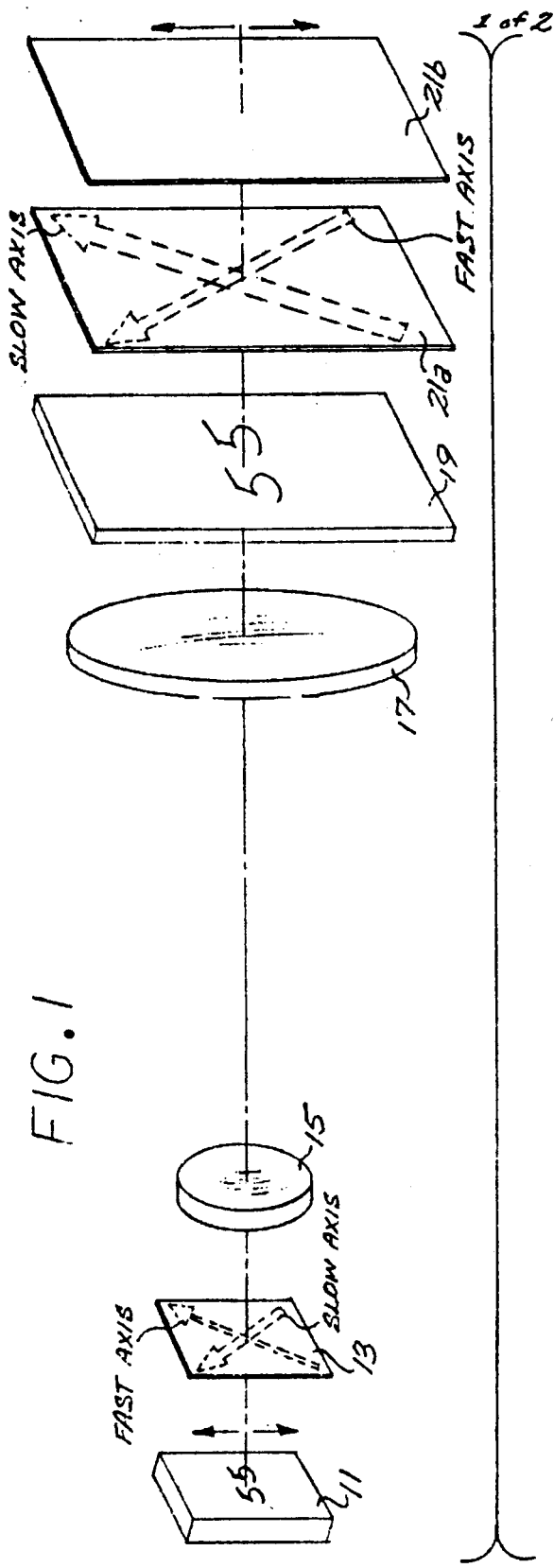

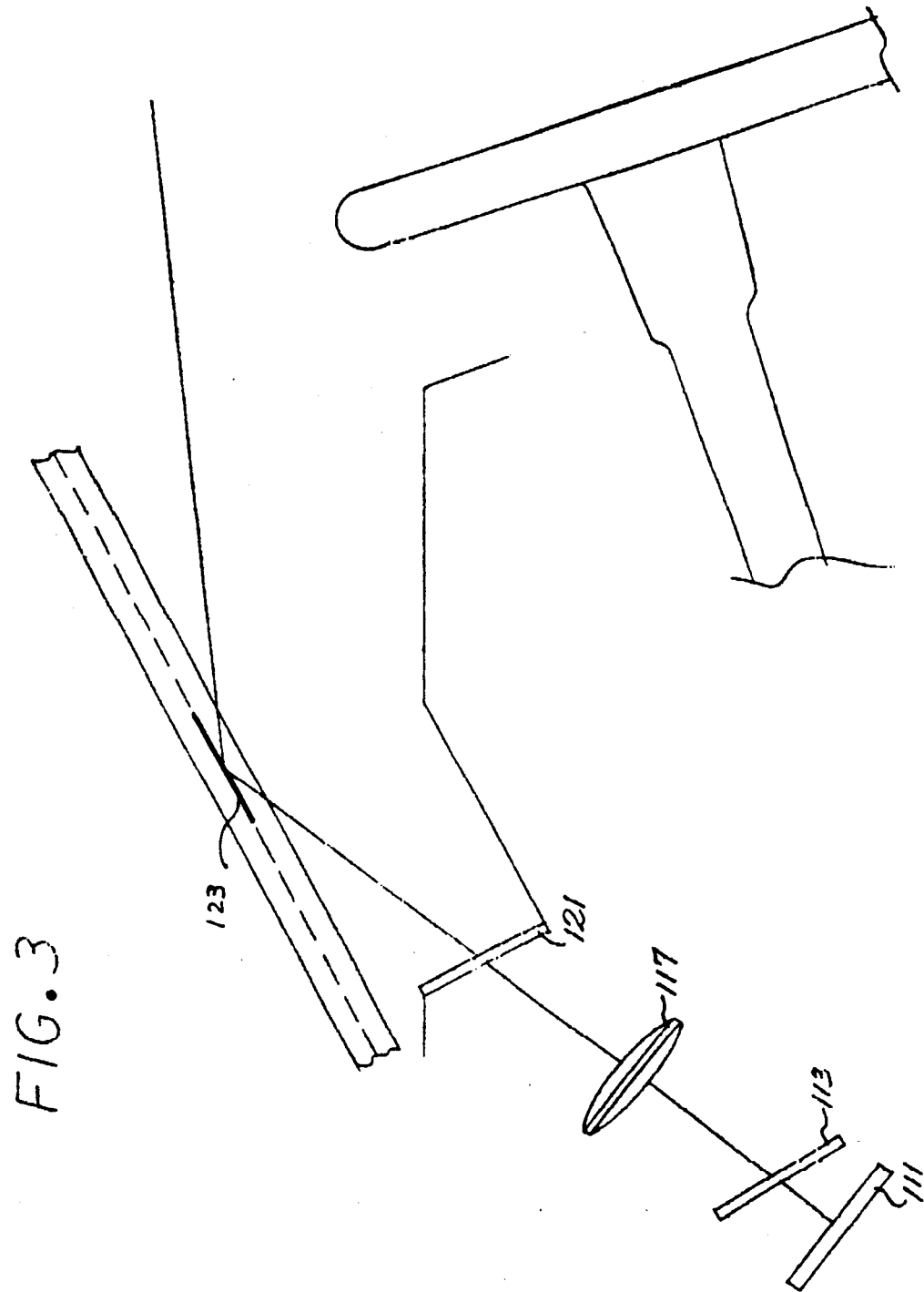

HIGH THROUGHPUT CONTRAST ENHANCEMENT FOR POLARIZED DISPLAYS

BACKGROUND OF THE INVENTION

The disclosed invention is directed generally to polarized displays, and more particularly to a polarized display with high throughput contrast enhancement.

Polarized displays, such as liquid crystal device (LCD) displays, are utilized for many purposes including instrument panel displays for vehicles such as automobiles.

A consideration with polarized displays, and displays in general, is the reduced contrast that results from the reflection of ambient light from the display surface. Absorptive filters of various types have been commonly utilized to enhance display contrast, but typically at the expense of brightness. In other words, although such filtering increases contrast, the light from the display is attenuated.

SUMMARY OF THE INVENTION

It would therefore be an advantage to provide contrast enhancement for a polarized display which does not substantially attenuate the light output of the display.

The foregoing and other advantages are provided by the invention is a display that includes a display source for producing linearly polarized imaging illumination, a quarter-wave retarder for transforming the linearly polarized imaging illumination to circularly polarized imaging illumination having a first circular polarization, and imaging means responsive to the circularly polarized imaging illumination for producing a viewable image. A circular polarizer transforms the polarization of the image output of the imaging means to linearly polarized illumination. The circular polarizer particularly includes a quarter-wave retarder configured to transform the circularly polarized imaging illumination to linearly polarized illumination and a linear polarizer that is aligned to transmit such linearly polarized illumination. Examples of the imaging means include a projection lens system and an imaging screen, or a projection lens system for producing a virtual image. In any case, the imaging means includes some element near the front of the display which is subject to ambient light.

Ambient light incident on the circular polarizer is absorptively filtered so that the light that passes through to the front element of the imaging means (e.g., a screen or lens) is substantially of the first circular polarization. Pursuant to reflection from the front element of the imaging means, the circular polarization of such ambient light is reversed to be that of a second circular orientation, which is substantially blocked by the quarter-wave retarder of the circular polarizer.

Thus, the imaging illumination transmitted by the front element of the imaging means passes through the circular polarizer substantially unattenuated while ambient light reflected by the front element of the imaging means is substantially blocked.

BRIEF DESCRIPTION OF THE DRAWING

The advantages and features of the disclosed invention will readily be appreciated by persons skilled in the art from the following detailed description when read in conjunction with the drawing wherein:

FIG. 1 is a schematic diagram depicting the elements of a polarized display in accordance with the invention.

FIG. 2 is a schematic side view of the display of FIG. 1.

FIG. 3 is a schematic side view of a further display in accordance with the invention.

DETAILED DESCRIPTION OF THE DISCLOSURE

In the following detailed description and in the several figures of the drawing, like elements are identified with like reference numerals.

Referring now to FIGS. 1 and 2, shown therein, in accordance with the invention, is a polarized display 10, which by way of example is useful in automobile instrument displays and other applications where the presence of ambient light can cause a reduction in contrast.

The polarized display includes a polarized image source 11 for providing linearly polarized imaging illumination. The polarized imaging illumination, which by way of illustrative example is indicated as being vertically polarized, passes through a quarter-wave retarder 13 which is configured to transform the linearly polarized imaging illumination to circularly polarized imaging illumination. For ease of reference, circularly polarized illumination will be referred to as circular illumination or circular light. The quarter-wave retarder 13 is particularly oriented so that the incident polarization is at a 45 degree inclination relative to the fast and slow axes of the retarder that are at 90 degrees relative to each other. By way of illustrative example, the fast and slow axes of the retarder 13 can be oriented as shown in FIG. 1.

Pursuant to the illustrative example of the orientation of the fast and slow axes of the quarter-wave retarder 13, the circularly polarized imaging illumination from the retarder is left circularly polarized as would be viewed a hypothetical observer toward whom the circular light is moving.

The circular imaging illumination provided by the quarter-wave retarder 13 is imaged by a projection lens 15 and a field lens 17 on to a screen 19, for example a diffusion screen, which does not affect polarization and provides diffuse circular imaging illumination that is viewable by an observer. While the projection lens 15 is shown as a simple concave lens for ease of illustration, it would typically be implemented as a multiple element lens for providing diverging illumination. The field lens 17 typically would be some form of convex or converging lens.

Illumination from the screen 19 passes to a circular polarizer 21 which includes a quarter-wave retarder 21a configured to transform the diffuse circular imaging illumination to have a linear polarization. The circular polarizer 21 further includes a linear polarizer 21b configured to transmit the linearly polarized illumination from the quarter-wave retarder 21a to the observer.

Preferably, for relatively wideband image sources, the linear polarization output of the circular polarizer 21 should be of the same orientation as the output of the image source 11, which in the illustrative example is vertical polarization. This, is achieved by configuring the quarter-wave retarder 21a to have its fast and slow axes oriented at 90 degrees relative to the fast and slow axes of the quarter-wave retarder 13, and by configuring the linear polarizer to have a vertical transmission axis.

With such particular quarter-wave retarder 21a and linear polarizer 21b, the circular imaging illumination from the screen 19 is transformed by the quarter-wave retarder 21a to vertically polarized imaging illumination that is transmitted by the linear, polarizer 21b.

The circular polarizer 21 functions as follows relative to ambient illumination, which would be typically randomly polarized. The linearly vertically polarized component of the ambient illumination passes through the linear polarizer 21b substantially unaffected, while the remaining components of the ambient illumination are substantially blocked. The transmitted linearly, vertically polarized ambient light is transformed by the quarter-wave retarder 21a to be left circularly polarized (as described above, the quarter-wave retarder 21a changes the polarization of the left circularly polarized imaging illumination transmitted by the diffusion screen 19).

When left circular ambient light transmitted by the quarter-wave retarder 21a is reflected by the diffusion screen 19, the circular polarization of the reflected light is reversed, being reflected right circularly polarized ambient light. The right circular light reflected by the diffusion screen toward the observer will be transformed to horizontally linearly polarized light by the quarter-wave retarder 21a. Such horizontally linearly polarized light is substantially blocked by the linear polarizer 21b which, as described above, is configured for the particular illustrative example to pass linearly vertically polarized light.

Thus, display illumination from the diffusion screen 19 is transmitted substantially unattenuated through the circular polarizer 21, while ambient light transmitted by the circular polarizer to the diffusion screen and reflected thereby is substantially blocked by the circular polarizer. Contrast enhancement is accordingly achieved with minimal attenuation of display illumination.

In the above illustrative example of the polarized display system 10, the quarter-wave retarders can be essentially identical elements that are rotated at 90 degrees relative to each other about the normal or propagation axis. In other words, the quarter-wave retarders subtract and therefore the polarization axis of the imaging illumination provided by the quarter-wave retarder 21a is parallel to the polarization axis of the imaging illumination provided by the image source 11. For wideband image sources, such subtracting quarter-wave retarders are preferred so as to avoid chromatic aberration that otherwise would occur if the quarter-wave retarders were oriented with their fast axes in parallel and their slow axes in parallel. However, for narrow band image sources, the quarter-wave retarders and the linear polarizer could be configured so that imaging illumination observed by the observer is of a different linear polarization than the illumination provided by the polarized image source 11. The important consideration is to configure the circular polarizer to circularly polarize the incoming ambient light so that the circularly polarized light reflected by the diffusion screen 19 is ultimately absorptively blocked by the linear polarizer 21b.

The quarter-wave retarders should be zero order retarders for wideband sources, but can be multi-order for narrow band image sources. The center of the quarter-wave retardance should be centered at about the peak of the output of the image source.

In the above discussed illustrative example, the display has been configured to provide vertically linearly polarized illumination to the observer so as to prevent blockage of the display output by polarized sunglasses which typically are adapted to block horizontally polarized illumination A polarized display in accordance with the invention that utilizes optical elements for producing a virtual image is schematically illustrated in FIG. 3 as implemented for a vehicle instrument display. The display includes a polarized image source 111, a quarter-wave retarder 113, an imaging lens 117, a circular polarizer 121, and an optical combiner 123 at the vehicle windshield for receiving the imaging illumination provided by the circular polarizer. The display of FIG. 3 differs from the display of FIGS. 1 and 2 in the use of an optical combiner and an imaging lens. In particular, the combiner reflects imaging illumination to produce a virtual image that is viewable by the driver, and the imaging lens functions to locate the virtual image at a location ahead of the windshield. By way of illustrative examples, the combiner 123 can comprise a reflection hologram supported between the layers of a standard safety windshield, or the inside surface of the windshield.

In the display of FIG. 3, the circular polarizer 121 is perpendicular to the windshield, and the quarter-wave retarder 113 is parallel to the circular polarizer 121 to prevent reflections caused by such elements from reaching the eyes of the driver.

Relative to ambient light first surface reflections off the imaging lens, the display of FIG. 3 functions in substantially the same manner as the display of FIGS. 1 and 2 for substantially blocking the reflection from the imaging lens of ambient light that passes through the circular polarizer to the imaging lens.

While the foregoing structure has been discussed in the context of polarized image sources such as LCDs, it should be appreciated that the invention will provide some benefit with image sources that provide partially polarized imaging illumination.

The foregoing has been a disclosure of a display which includes a polarized or partially polarized image source and provides for contrast enhancement while providing for minimal attenuation of the display illumination.

Although the foregoing has been a description and illustration of specific embodiments of the invention, various modifications and changes thereto can be made by persons skilled in the art without departing from the scope and spirit of the invention as defined by the following claims.

What is claimed is:

1. A polarized display comprising:
   a display source for producing source imaging illumination that includes linearly polarized imaging illumination;
   a first quarter-wave retarder having a fast axis for transforming the linearly polarized imaging illumination to circularly polarized imaging illumination;
   a second quarter-wave retarder having a fast axis for transforming the circularly polarized imaging illumination to linearly polarized illumination having the same polarization orientation as the source imaging illumination, said second quarter-wave retarder having its fast axis oriented 90 degrees relative to the fast axis of said first quarter-wave retarder; and
   a linear polarizer responsive to the linearly polarized imaging illumination provided by said second quarter-wave retarder for providing an image viewable by an observer of the display;

whereby said second quarter-wave retarder and said linear polarizer function to substantially block reflection that results from ambient light that passes through said second quarter-wave retarder and is reflected back through the second quarter-wave retarder toward said linear polarizer.

2. A polarized display comprising:

a display source for producing source imaging illumination that includes linearly polarized imaging illumination;

a first quarter-wave retarder having a fast axis for transforming the linearly polarized imaging illumination to circularly polarized imaging illumination;

a diffusion screen;

imaging means for imaging said circularly imaging illumination on to said diffusion screen which provides diffused circularly polarized imaging illumination;

a second quarter-wave retarder having a fast axis for transforming the diffused circularly polarized imaging illumination to linearly polarized illumination having the same polarization orientation as the source imaging illumination, said second quarter-wave retarder having its fast axis oriented 90 degrees relative to the fast axis of said first quarter-wave retarder; and a linear polarizer responsive to the linearly polarized imaging illumination provided by said second quarter-wave retarder for providing an image viewable by an observer of the display;

whereby said second quarter-wave retarder and said linear polarizer function to substantially block reflection that results from ambient light that passes through said second quarter-wave retarder and is reflected back through the second quarter-wave retarder toward said linear polarizer.

* * * * *